June 25, 1968  H. W. D. CASSIDY ET AL  3,389,659
IGNITION APPARATUS FOR ROCKET MOTORS
Filed April 5, 1966  2 Sheets-Sheet 1
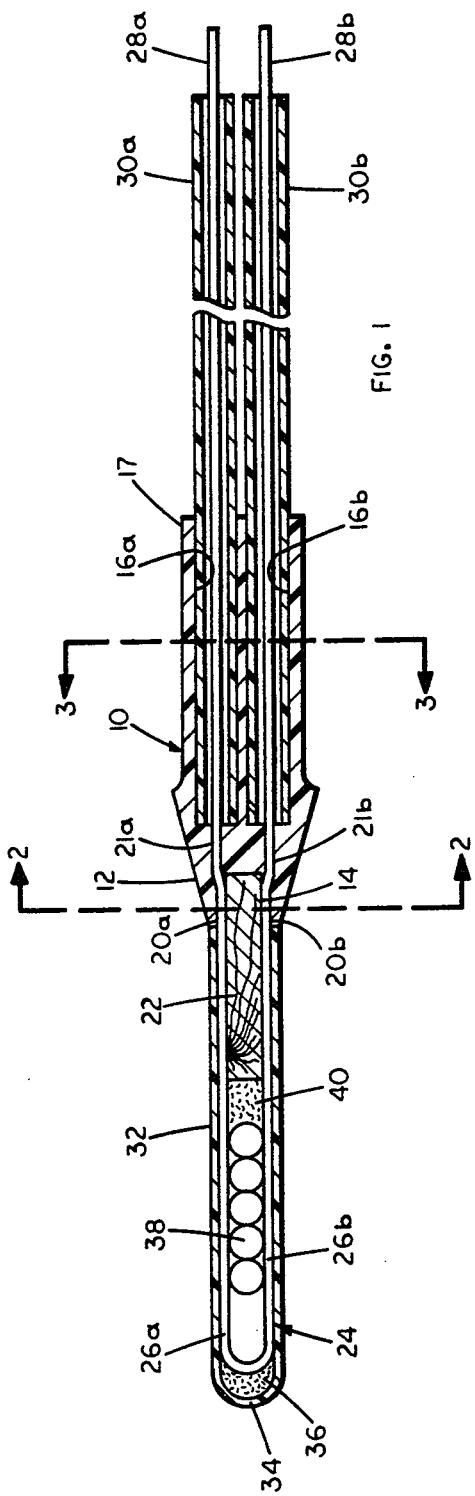
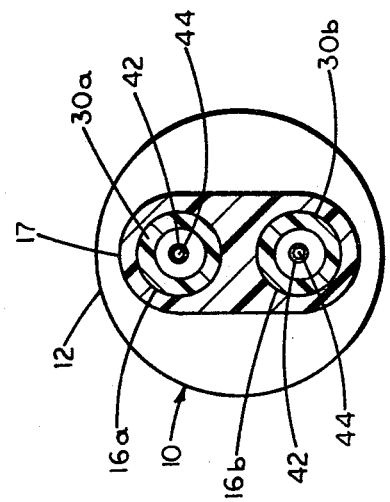
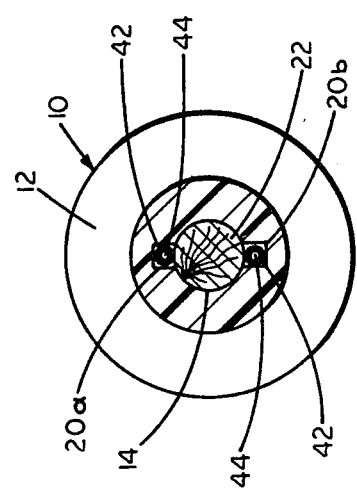
INVENTORS:
H. W. D. CASSIDY
J. J. SCHWARTZ
BY: Edwin D. Grant
ATTORNEY June 25, 1968  H. W. D. CASSIDY ETAL  3,389,659
IGNITION APPARATUS FOR ROCKET MOTORS
Filed April 5, 1966  2 Sheets-Sheet 2

INVENTORS:
H. W. D. CASSIDY
J. J. SCHWARTZ
BY: Edwin D. Grant
ATTORNEY

United States Patent Office 3,389,659
Patented June 25, 1968

3,389,659
IGNITION APPARATUS FOR ROCKET MOTORS
Herbert Wesley Dwight Cassidy, Elkton, Md., and Jules Jacob Schwartz, Wilmington, Del., assignors to Thiokol Chemical Corporation, Bristol, Pa., a corporation of Delaware
Filed Apr. 5, 1966, Ser. No. 546,116
3 Claims. (Cl. 102—70)

ABSTRACT OF THE DISCLOSURE

Ignition apparatus for ignition of a rocket motor having a casing nestable in the exit cone of the motor and provided with internal passages for passing a fuse cord therethrough into the chamber of the motor. The cord is connected to a combustible charge abuttingly adjacent the propellant charge of the motor.

---

This invention relates to rocket motors and more particularly to an improved, simplified system for igniting solid propellant grains of rocket motors.

Heretofore solid propellant rocket motors have been ignited by means of initiators or squibs mounted within the casings of such rocket motors adjacent the grains thereof and connected by means of lead wires to a source of electric current, such as a battery. Ignition systems of the type described have certain disadvantages, among which is their susceptibility to being prematurely actuated by stray electromagnetic signals. The ejection of the electrical leads of such ignition systems from a rocket motor at the time of its launch can also present a problem, particularly where a solid propellant grain must be ignited at a plurality of points along a perforation therein and electrical leads are extended through the perforation for this purpose. Furthermore, ignition of a solid propellant grain at different points thereon in sequence can only be achieved, with electrical ignition systems, by means of expensive and complicated delay devices.

It is accordingly an object of this invention to provide an improved, nonelectrical apparatus for igniting solid propellant grains of rocket motors.

Another object of this invention is to provide an ignition apparatus for solid propellant rocket motors that cannot be prematurely actuated by stray electromagnetic signals.

An additional object of this invention is to provide a rocket motor ignition system the components of which are combustible and thus readily ejected from a rocket motor or consumed within the casing thereof at the time of launch.

Still another object of this invention is to provide an inexpensive rocket motor ignition system by means of which a solid propellant grain can readily be ignited at different points thereon at different times.

A further object of this invention is to provide a nonelectrical ignition system that can conveniently be assembled and installed at any selected point adjacent the solid propellant grain of a rocket motor.

These objects and advantages, as well as others disclosed hereinafter, are achieved in embodiments of the invention each of which comprises: a pair of fuse cords that extend from a point outside a rocket motor to a point adjacent the solid propellant grain thereof; at least one combustible charge abuttingly disposed between said fuse cords adjacent said grain; and an elastomeric tube disposed around said charge and fuse cords.

In the accompanying drawings:

FIGURE 1 is a partially sectional view of components of a preferred embodiment of the invention;

FIGURE 2 is a cross-sectional view of certain components of the same embodiment, taken along the plane represented by line 2—2 of FIGURE 1;

FIGURE 3 is a cross-sectional view of certain components of the same embodiment, taken along the plane represented by line 3—3 of FIGURE 1.

Throughout the specification and drawings, like numbers designate like parts.

Figure 4:
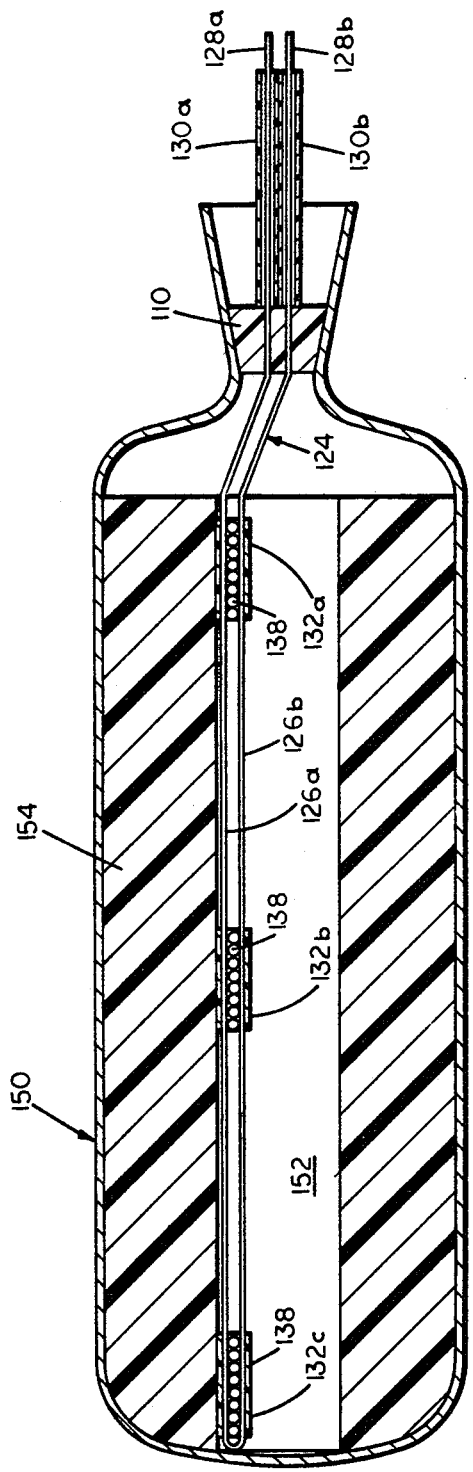
FIGURE 4 is a longitudinal sectional view of a solid propellant rocket motor and components of a second embodiment of the invention.

The preferred embodiment of the invention illustrated in FIGURE 1 comprises a seal member, generally designated by number 10, the forward frustoconical portion 12 of which is shaped to conformably fit within the exit cone of a rocket motor thrust nozzle (not shown). As illustrated in FIGURES 1 and 2, a hole 14 is formed in portion 12 of seal member 10, this hole extending from the forward end of said seal member to a point spaced from the bottom surfaces of two holes 16a, 16b which are formed in the aft portion 17 of said seal member and which extend longitudinally thereof (see FIGURE 3 for a cross-sectional view of said aft portion 17 and holes 16a, 16b). Two longitudinally extending grooves 20a, 20b are formed at diametrically opposed points on the wall of hole 14, these grooves respectively extending to two passages 21a, 21b that in turn extend between the bottom surface of hole 14 and holes 16a, 16b respectively. The aft end of a rod-shaped spacer 22 is engaged within hole 14, and the forward portion of said spacer projects from the forward end surface of seal member 10. A fuse cord, generally designated by number 24, is looped as illustrated in the drawing so as to form parallel portions, or legs 26a, 26b thereof which are respectively threaded through the grooves 20a, 20b and passages 21a, 21b in seal member 10 and which extend forward of said seal member. The two legs 26a, 26b of fuse cord 24 also extend from the aft end of seal member 10 to suitable means, such as a device capable of producing electrical arcs, for igniting the remote ends 28a, 28b of said fuse cord. A tube 30a, 30b covers each leg 26a, 26b of fuse cord 24 from a point adjacent the remote end thereof to the bottom of a respective one of the holes 16a, 16b in the aft portion 17 of seal member 10, the inside diameter of each of these tubes being larger than the diameter of the fuse cord for a reason explained hereinafter. Tubes 30a, 30b provide a thermal barrier for the portions of fuse cord 24 which are increased therein and also protect said portions from mechanical damage.

Spacer 22 projects into the aft portion of a tubular elastomeric casing 32, thereby securing said casing firmly to seal member 10. The forward end of casing 32 is closed by an integral end closure 34, the looped fuse cord 24 extending through casing 32 from a point adjacent said end closure and a charge 36 of granular igniter material being abuttingly disposed between said fuse cord and said end closure. A plurality of combustible igniter charges 38 are also abuttingly and tandemly disposed between the parallel legs 26a, 26b of fuse cord 24 within casing 32, the inside diameter of which is such that said fuse cord is held firmly against the igniter charges. In the illustrated embodiment of the invention, each igniter charge 38 is a cylindrical solid pellet disposed with its longitudinal axis substantially perpendicular to the longitudinal axis of casing 32. However, a single shaped charge or a loose, granular charge can be substituted for the illustrated pellets. Preferably the wall of casing 32 abuts the opposite faces of igniter charges 38, which contact can be effected either by forming the casing with an oblong cross-section or by forming the casing with an inside diameter less than the diameter of the igniter charges so that when the latter are pressed into the casing between the parallel legs 26a, 26b of fuse cord 24, the wall of the casing will be stretched across the opposite faces of the igniter charges and brought into contact therewith. It will be noted that the arrangement of igniter charges 38 within casing 32 provides space between juxtaposed charges (more specifically, a space on each side of the line of contact between the side edges of the juxtaposed pellets). Abuttingly disposed between the aft igniter charge 38 and the forward end of spacer 22 is a second charge 40 of granular igniter material. This second charge 40, as well as charge 36 at the forward end of casing 32, may be omitted in some embodiments of the invention, depending upon the burning characteristics desired for a particular application of the igniter assembly.

Seal member 10 is preferably made of a polymeric material that can conveniently be cast to conform the periphery of the forward portion 12 thereof to the inner surface of the exit cone of a rocket motor thrust nozzle. In the preferred embodiment of the invention herein described, spacer 22 is made of wood, although this component could be made of any non-conductive material. As illustrated in FIGURES 2 and 3, fuse cord 24 comprises a continuous length of metallic tubing 42 containing lead azide 44 or other pyrotechnic material which is covered by a thin combustible sheath of elastomeric material (not shown). The tubes 30a, 30b and casing 32 are also formed of elastomeric materials, and the two charges 36 and 40 and igniter charges 38 consist of a composition containing boron and potassium nitrate (which composition is in loose, granular form in the charges but pressed into a solid material in the igniter pellets). Fuse cord 24 may also be a bimetallic type fuse wire such as that marketed by Pyrofuze Corporation under the trademark designation "Pyrofuse."

The above-described components of the preferred embodiment of the invention can quickly and conveniently be assembled to provide igniter systems for rocket motors of different sizes by casting seal member 10 either within the exit cone of the thrust nozzle of a rocket motor in which the invention is to be used or within a mold having the shape of the exit cone of said thrust nozzle. Passages 21a, 21b, hole 14 and holes 16a, 16b in seal member 10 can readily be formed during the casting operation or machined thereafter. If seal member 10 is precast, fuse cord 24 is threaded through passages 16a, 16b and the looped forward portion thereof is inserted within casing 32. After charge 36 has been dropped into casing 32, igniter charges 38 are placed between the parallel legs 26a, 26b of fuse cord 24 and pressed into the casing one after another. Charge 40 is then placed in casing 32 and the aft end of the casing is pressed over the portion of spacer 22 that projects from the forward portion 12 of seal member 10 as the two legs of fuse cord 24 are pulled through the passages 16a, 16b, respectively, of said seal member. If desired, two shallow, longitudinally extending grooves can be formed on spacer 22 to maintain the legs 26a, 26b of fuse cord 24 in the proper position on opposite sides of the spacer during the assembly of the components. Adhesive can also be employed to bond the aft end surface of casing 32 to the forward end surface of seal member 10. Tubes 30a, 30b are next placed on the two lengths of fuse cord 24 that extend from seal member 10 to the point where the ignition apparatus is to be actuated.

It will be apparent that casing 10 can be cut to any desired length so that the igniter charges 38 held therein will be located adjacent the grain (and generally within a central perforation therein) of a solid propellant rocket motor when seal member 10 is positioned within the thrust nozzle of said rocket motor. When the grain of the rocket motor is to be ignited, the ends 28a, 28b of fuse cord 24 can simultaneously be ignited by suitable means, such as the aforementioned conventional apparatus capable of producing electric arcs. The two legs of fuse cord 24 then rapidly burn through tubes 30a, 30b and seal member 10. When burning reaches the igniter charges 38, they are ignited and the gases thereby generated rupture (or burn) casing 32 and ignite the adjacent solid propellant grain of the rocket motor, whereupon the combustion gases of said grain blow seal member 10 out of the thrust nozzle in which it is engaged. Obviously the wall thickness of casing 32 for a particular application of the invention will depend upon the type, number and size of the igniter charges held in the casing, as well as upon the type of material of which the casing is made. It has been found, for example, that a polyethylene casing 2.25 inches long, 0.2 inch in outside diameter, and having a wall thickness of 0.015 inch will be ruptured by 7 igniter charges disposed as illustrated in the drawing (i.e., with the longitudinal axis of each igniter charge perpendicular to the longitudinal axis of casing 32), each igniter charge being in the form of a solid cylindrical pellet 0.10 inch thick with a diameter of 0.10 inch. Rupture of tubes 30a, 30b is prevented by making the inside diameter of the tubes larger than the diameter of the fuse cord positioned therein, and by increasing the wall thickness of the tubes.

Among the advantages of the aforedescribed ignition apparatus is its light weight and relatively low cost. Furthermore, the components of the apparatus are readily burned by the high-temperature combustion gases of a solid propellant grain, thus eliminating the problems associated with ignition systems comprising metallic parts which can remain intact for a comparatively long time after a solid propellant grain has been ignited and which can interfere with the operation of the rocket motor during the critical launch period. Additional advantages of the preferred embodiment of the invention are its immunity from accidental actuation by stray electromagnetic signals, its increased reliability resulting from the provision of two ignition trains (i.e., the two parallel portions 26a, 26b of fuse cord 24), its versatility for installation in rocket motors of different size and lengths, and its adaptability for rapid assembly and installation in rocket motors by persons having ordinary mechanical skills. When the igniter charges 38 are positioned within casing 32 in the aforedescribed arrangement (namely, with the longitudinal axis of each pellet disposed perpendicular to the longitudinal axis of said casing), edge burning of the igniter charges occurs and propagation of the flame between the igniter charges is extremely rapid.

FIGURE 4 illustrates another embodiment of the invention comprising a seal member 110, a fuse cord (generally designated by number 124) looped to provide two parallel portions, or legs, 126a, 126b, and two protective tubes 130a, 130b disposed around the portions of said fuse cord 124 outside the rocket motor (generally designated by number 150) in which the embodiment is used. The two legs 126a, 126b of fuse cord 124 extend through three elastomeric, tubular casings 132a, 132b, 132c which are bonded in longitudinally spaced relation to the wall of a central perforation 152 in the solid propellant grain 154 of rocket motor 150. A purality of igniter charges 138 are abuttingly disposed between the portions 126a, 126b of fuse cord 124 within each casing 132, and more particularly the igniter charges are in the form of cylindrical pellets tandemly positioned within their respective casing with the longitudinal axis of each pellet disposed perpendicular to the longitudinal axis of said casing.

The fuse cord 124 of the second embodiment of the invention comprises a continuous length of a bimetallic fuse wire having a considerably lower burning rate than that of fuse cord 24 of the first described embodiment. Hence, when the ends 128a, 128b of fuse cord 124 are ignited, the ignition charges 138 in casings 132a, 132b, 132c are ignited successively, whereupon said casings are successively ruptured (or burned) and grain 154 is ignited at three longitudinally spaced points thereon in a delayed sequence. The arrangement of the second embodiment of the invention thus provides an effective, inexpensive ignition system by means of which delayed ignition of different portions of a solid propellant grain can be accomplished. It is to be understood that the fuse cord or wire referred to in this embodiment may be identical to that illustrated in FIGURE 1 of the former embodiment. Furthermore, it will be apparent that the number of casing 132 and igniter charge 138 assemblies can be more or fewer than the three shown in the drawing for the purpose of illustration, the arrangement of the components of this embodiment of the invetnion being such that any number of such assemblies can be provided within a rocket motor casing with great convenience.

It will be recognized that various modifications can be made in the described components of the invention without, however, departing from the invention, the scope of which is set forth in the appended calims. For example, many different types of fuse cords can be employed, and the position of the casings 32, 132 within a rocket motor can be widely varied. In some instances, a single fuse cord can be passed through one or more elastomeric casings 32, 132, and one or more igniter charges held against this fuse cord by means of the casings. Other changes of similar nature will be obvious to persons skilled in the art of rocket motors.

We claim:
1. Ignition apparatus for igniting a solid propellant grain of a rocket motor, comprising:
  a pair of parallel fuse cords extending from outside said motor to the interior thereof and positioned adjacent said grain, a plurality of combustible igniter charges abuttingly and tandomly disposed in groups between said cords adjacent said grain, and an elastomeric, tubular casing disposed around each of said groups of charges and said fuse cords holding said cords against said charges and being rupturable by gas generated by combustion of said charges;
  said ignition charges being in the form of a solid cylindrical pellet each disposed with its longitudinally axis substantially perpendicular to the longitudinal axis of said casing;
  and said groups of charges being spaced longitudinally of said cords adjacent different portions of said grain.
2. The apparatus of claim 1 wherein said fuse cords are arranged in a loop within said casing in said motor.
3. The apparatus of claim 1 further including a seal member adapted to conformably fit the nozzle of said motor and having passages therethrough extending longitudinally thereof.

References Cited
UNITED STATES PATENTS

| | | | |
|---|---|---|---|
| 2,995,088 | 8/1961 | Asplund | 102—70 |
| 3,251,267 | 5/1966 | Hauser et al. | 102—49.7 |
| 3,287,913 | 11/1966 | Boydston | 60—35.6 |

BENJAMIN A. BORCHELT, *Primary Examiner.*

SAMUEL FEINBERG, *Examiner.*

G. H. GLANZMAN, *Assistant Examiner.*